Patented June 26, 1928.

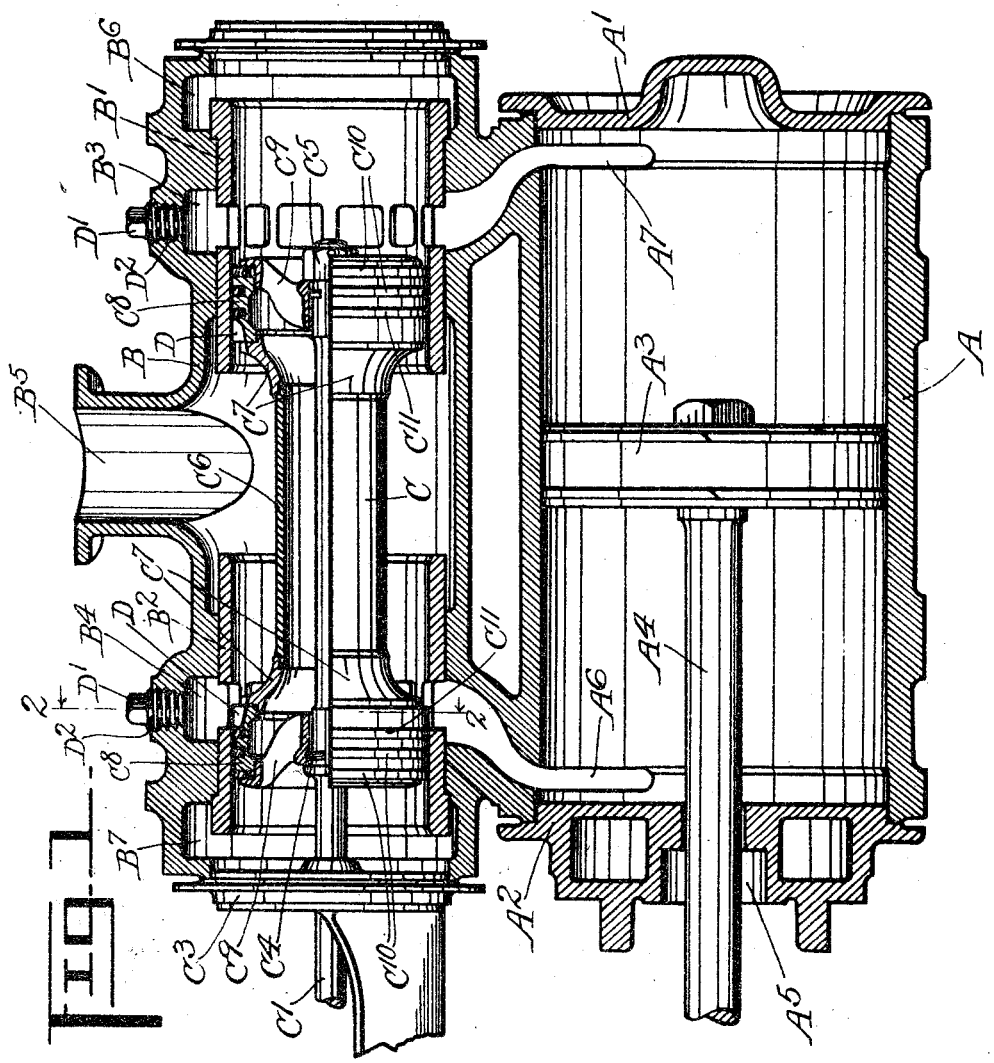

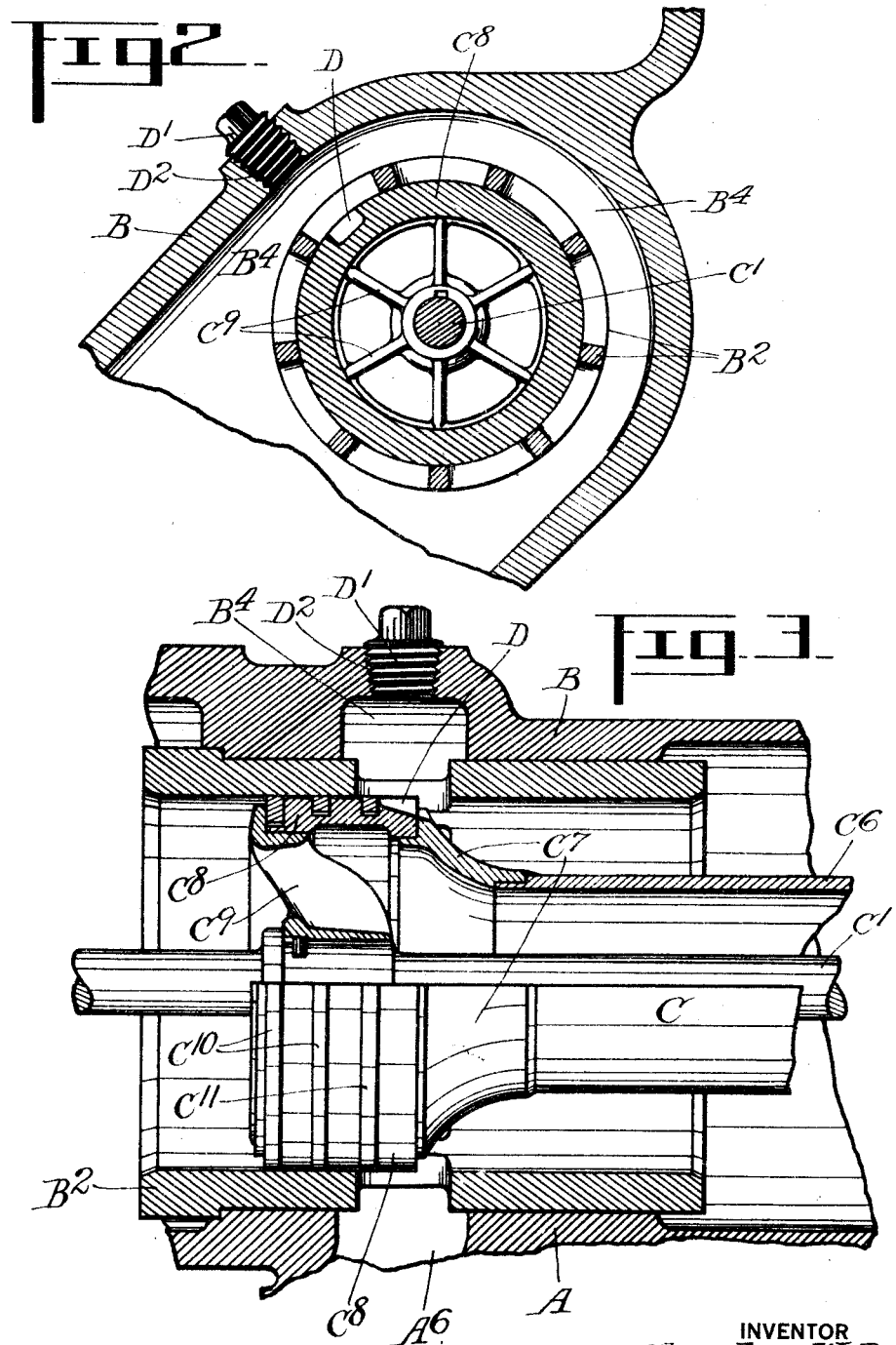

1,675,307

UNITED STATES PATENT OFFICE.

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY.

PISTON VALVE.

Application filed September 29, 1927. Serial No. 222,847.

My invention relates to improvements in distribution valves for steam engines and the like and has for one object to provide a new and improved type of valve wherein the control of fluid distribution by the valve elements varies under different conditions of speed without variation in valve movement. Another object is to provide a reciprocating valve having a working edge adapted to control fluid distribution together with an auxiliary working edge associated with the valve adapted to give a different character of fluid distribution. Another object is to provide a valve having a normal working edge with an opening or aperture adjacent to such working edge terminating in an auxiliary working edge with means whereby such opening can be kept clean and can be cleaned out by the operator when that becomes necessary without interfering with valve connections and valve operation and without moving the valve out of its normal working position. Other objects will appear from time to time throughout the specification and claims.

My invention is illustrated more or less diagrammatically in the accompanying drawings, wherein—

Figure 1 is a longitudinal section through the engine;

Figure 2 is a section along the line 2—2 of Figure 1;

Figure 3 is a detail section through one end of the valve.

Like parts are indicated by like characters throughout.

A is a cylinder, the ends of which are closed by the cylinder heads $A^1$ $A^2$. $A^3$ is the piston, $A^4$ the piston rod extending through the cylinder head $A^2$, there being provision for packing glands at $A^5$. $A^6$ $A^7$ are steam passages discharging into the opposed ends of the piston and controlled by the piston valve.

B is the valve housing. In either end thereof are ported valve sleeves $B^1$ $B^2$. The ports in the valve sleeves discharge into steam passages $B^3$ $B^4$ which communicate with the passages $A^7$ $A^6$ respectively. $B^5$ is the admission steam passage discharging to the central portion of the valve chest.

C is a piston valve. It comprises a valve stem $C^1$ extending out through the head $C^3$, there being packing of any suitable type not here illustrated. This valve stem extends clear through the valve. It has a shoulder $C^4$ at one end and a threaded end upon which is mounted a nut $C^5$ at the other. Compressed between this shoulder and this nut are the central filler sleeves $C^6$ having at their ends funnel shaped members $C^7$, bull rings $C^8$ and holding spiders $C^9$. Packing rings $C^{10}$ $C^{11}$ are held in the bull ring and engage the sleeves $B^1$ $B^2$. The two opposed inner edges of the bull ring serve as cut off edges.

The auxiliary or duplex cut off is provided by the notch or channel D, there being one in the inner edge of each of the two bull rings, the arrangement being such that at the point where this notch is made the cut off edge is stepped back into the bull ring a distance equal to the longitudinal dimension of the notch. It happens that the packing ring $C^{11}$ in each case furnishes the auxiliary cut off edge at the point where it is in line with the notch but the packing ring has nothing to do with the normal or main cut off edge and the opening D is unobstructed and unobscured by the packing rings. Experience has shown that this notch may under some conditions gradually become filled up by carbon, dirt or other deposit which will reduce or perhaps even destroy the effectiveness of the auxiliary cut off. When this happens it becomes necessary to clean this notch and remove the obstructing material. This is done by positioning the valve piston by manipulation of the reversing lever in the cab until the valve piston resumes the position in Figure 3 with the auxiliary cut off notch D in line with the ports in the valve sleeve. When this is done the plug $D^1$ can be unscrewed and the operator can work through the hand hole $D^2$ in the wall of the valve housing and through the port in the valve sleeve to get at the aperture D. It is only necessary then to again manipulate the valve until the other end comes in contact with a steam handhole. Thus the cleaning can take place effectively without any change in the valve control mechanism and without interfering in any way with the valve timing or positioning.

I claim:

1. A distribution valve for steam engines comprising a piston including a bull ring, packing rings carried by the bull ring, a ported valve seat in which the piston reciprocates, the bull ring having a working edge adapted to traverse the ports, one of the packing rings being spaced longitudinally away from the working edge, a longitudinal channel in the outer periphery of the bull ring terminating at its inner end at the nearest packing ring.

2. A distribution valve for steam engines comprising a piston including a bull ring, packing rings carried by the bull ring, a ported valve seat in which the piston reciprocates, the bull ring having a working edge adapted to traverse the ports, one of the packing rings being spaced longitudinally away from the working edge, a longitudinal channel in the outer periphery of the bull ring terminating at its inner end at the nearest packing ring, a housing enclosing the seat and piston, a hand hole therein and a closure therefor, the hand hole, one of the ports and the channel being radially in line.

3. A distribution valve for steam engines comprising a piston including a bull ring, packing rings carried by the bull ring, a ported valve seat in which the piston reciprocates, the bull ring having a working edge adapted to traverse the ports, one of the packing rings being spaced longitudinally away from the working edge, a longitudinal channel in the outer periphery of the bull ring bounded at its inner end by one of the packing rings.

Signed at Chicago, county of Cook and State of Illinois, September, 1927.

CHARLES W. DAKE.